W. B. INGERSOLL.
Preserving Eggs.

No. 42,948.

Patented May 31, 1864.

Witnesses:

Inventor:
W. B. Ingersoll

UNITED STATES PATENT OFFICE.

W. B. INGERSOLL, OF NEW YORK, N. Y.

IMPROVEMENT IN PRESERVING EGGS AND OTHER ARTICLES.

Specification forming part of Letters Patent No. 42,948, dated May 31, 1864.

*To all whom it may concern:*

Be it known that I, W. B. INGERSOLL, of the city, county, and State of New York, have invented a new and Improved Process for Preserving Eggs and Fruits of Various Kinds; and I do hereby declare that the following is a full, clear, and exact description thereof, which will enable any person skilled in the art to use the same, reference being had to the accompanying drawings, forming a part of this specification, in which—

Figure 1:
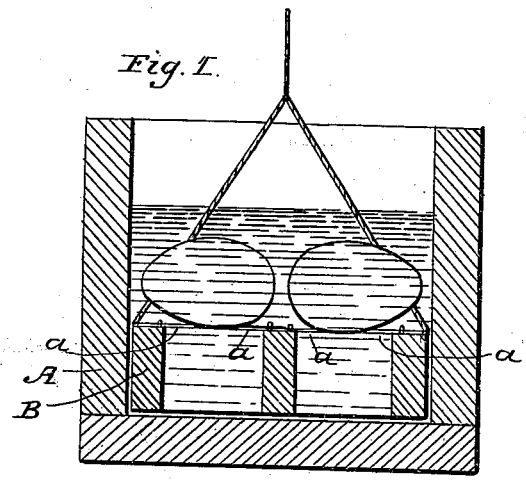
Figure 2:
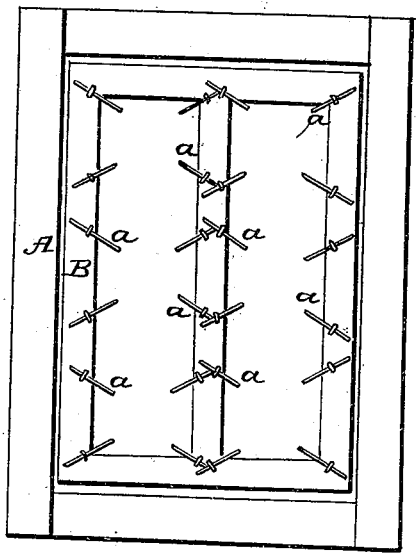

Figure 1 represents a transverse vertical section of the apparatus which I use in carrying out my process. Fig. 2 is a plan or top view of the same.

Similar letters of reference in both views indicate corresponding parts.

This invention consists in the employment or use of a rack with an open bottom and open sides, on which the eggs or fruits of various kinds or any other articles are placed, resting on one or more points, vertical, horizontal, or in any suitable position and of any desired material, for the purpose of immersion or for drying, in such a manner that the liquid or solution used for coating is enabled to come in contact with every portion of the surface, and in raising the rack from the liquid the eggs or fruits are in the proper position to dry without coming in contact with each other, which would cause them to stick together and to break while being separated.

A represents a tank or cistern, made of wood or any other suitable material, square, round, or in any desirable form or shape. The interior of this tank is occupied by one or more racks, B, consisting of square frames open at top and bottom and provided with a series of thin wires, *a*, secured in oblique positions on the top of the frames, as clearly shown in Fig. 2 of the drawings, and so situated that these wires are capable of supporting an egg. By these means the eggs, fruit, or other articles placed on the rack or racks are in such a position that the liquid in which the same are to be immersed has free access to every part of their surfaces, and that the eggs or fruits are sufficiently far apart to prevent them from coming in contact with each other. The racks B are suspended from ropes, or otherwise arranged so that they can be conveniently lowered into and raised from the tank A, and after a sufficient number of eggs or other articles have been placed on a rack the same is lowered into the tank, which is partially filled with the solution used for coating the eggs. This solution may be composed of the following ingredients: gum-arabic, one part; refined sugar, one part; white glue, one-third part; and sufficient water to obtain the desired consistency. I prefer, however, a solution of gum-dammar and rosin in benzine or naphtha.

I do not wish to confine myself, however, to any particular solution, but I reserve the right to use any solution or composition capable of producing the desired effect; or the eggs may be placed in the solution first for a shorter or longer time as experience may dictate, and then removed from the liquid and placed separately on the racks until they are dry. By drying them on the racks or by placing them separately for the purpose of drying by this process they are prevented from sticking together, and the danger of breaking them while being separated is avoided.

The simplicity of this process is unsurpassed, and by its use a person is enabled, with a trifling expense in labor and material, to preserve eggs for six months or more.

What I claim as new, and desire to secure by Letters Patent, is—

1. The rack upon which the eggs, fruits, or other articles may be placed, resting upon one or more points, either for the purpose of immersing them in any suitable material, then raising them out of it, and allowing them to remain there to dry, or for placing the eggs, fruit, or other articles upon for drying after their immersion in the liquid.

2. A solution composed of gum-dammar, rosin, and benzine or naphtha, for the purpose of coating articles to preserve the same.

W. B. INGERSOLL.

Witnesses:
    GILBERT W. BANKER,
    GEO. W. REED.